United States Patent
Stafford et al.

(10) Patent No.: US 12,053,699 B2
(45) Date of Patent: Aug. 6, 2024

(54) FOVEATED ENHANCEMENT OF NON-XR GAMES WITHIN A HMD SYSTEM

(71) Applicant: Sony Interactive Entertainment Inc., Tokyo (JP)

(72) Inventors: Jeffrey R. Stafford, San Mateo, CA (US); Patrick Connor, San Mateo, CA (US); Andrew Young, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 110 days.

(21) Appl. No.: 17/729,402

(22) Filed: Apr. 26, 2022

(65) Prior Publication Data

US 2023/0338841 A1  Oct. 26, 2023

(51) Int. Cl.
*A63F 13/25* (2014.01)
*A63F 13/213* (2014.01)
*A63F 13/52* (2014.01)

(52) U.S. Cl.
CPC ............ *A63F 13/52* (2014.09); *A63F 13/213* (2014.09); *A63F 13/25* (2014.09); *A63F 2300/1087* (2013.01); *A63F 2300/6615* (2013.01); *A63F 2300/8082* (2013.01)

(58) Field of Classification Search
CPC ........ A63F 13/52; A63F 13/213; A63F 13/25; A63F 2300/1087; A63F 2300/6615; A63F 2300/8082
See application file for complete search history.

(56) References Cited

U.S. PATENT DOCUMENTS

| | | | | |
|---|---|---|---|---|
| 11,721,063 B1* | 8/2023 | Serrano | ............. | G06T 15/20 |
| | | | | 345/419 |
| 2010/0026722 A1* | 2/2010 | Kondo | ............. | G09G 5/02 |
| | | | | 345/660 |
| 2012/0146891 A1* | 6/2012 | Kalinli | ............. | H04N 19/33 |
| | | | | 345/156 |
| 2013/0070109 A1* | 3/2013 | Gove | ............. | H04N 25/702 |
| | | | | 348/207.1 |
| 2019/0243445 A1* | 8/2019 | Kuwatani | ............. | A63F 13/87 |
| 2020/0018965 A1 | 1/2020 | Milner-Moore et al. | | |
| 2020/0241733 A1* | 7/2020 | Drake | ............. | A63F 13/25 |
| 2021/0173474 A1 | 6/2021 | Sztuk et al. | | |
| 2022/0347562 A1* | 11/2022 | Mason | ............. | A63F 13/25 |

OTHER PUBLICATIONS

"International Search Report and Written Opinion", issued Sep. 12, 2023 in the counterpart PCT application PCT/US23/66031.

* cited by examiner

*Primary Examiner* — Omkar A Deodhar
*Assistant Examiner* — Shauna-Kay N. Hall
(74) *Attorney, Agent, or Firm* — John L. Rogitz; John M. Rogitz

(57) ABSTRACT

By using the user head and/or eye tracking capabilities of an extended reality (XR) system, a region of gaze (ROG) of the user towards the virtual screen can be determined and signaled to non-XR games and applications running on the host system connected to the XR system. The existing non-XR games/applications can be patched, upgraded, or remastered to support the application of the ROG and ROG based enhancements of the visuals and user interfaces, using the provided by the system software on the host system that is rendering the game for the XR system.

19 Claims, 4 Drawing Sheets

1

FOVEATED ENHANCEMENT OF NON-XR GAMES WITHIN A HMD SYSTEM

FIELD

The present application relates generally to foveated enhancement of presentation of non-extended reality (XR) such as non-virtual reality (VR) computer games within augmented reality (AR), mixed reality (MR) or virtual reality (VR) systems collectively known as extended reality (XR) such as headsets including head-mounted displays (HMD).

BACKGROUND

As recognized herein, when non-XR computer games created for presentation on flat displays such as TVs are executed through a virtual cinematic presentation within a XR Head Mounted Display (HMD) system, they are presented as-is onto a virtual 2D or 3D Screen. The game's 2D or 3D output is displayed on a virtual 2D or 3D screen within the HMD system, closely matching how it would be displayed on a real standard or 3D TV.

However, as further recognized herein, this representation does not consider the user-orientated tracking features available on some HMD systems, such as the PlayStation® VR2 system from Sony Interactive Entertainment.

It is within this context that following solution is presented.

SUMMARY

By using the user head and/or eye tracking capabilities of a HMD system, a region of interest of the user's gaze towards the virtual screen can be determined. This Region of Gaze (ROG) can be signaled to the various games and applications running on the host system connected to the HMD system. The signal may include a coordinate of the gaze, a coordinate and a radius of the gaze, box coordinates defining an area of gaze, or other parameters to communicate the region of gaze from the HMD system to a game or application.

The existing non-XR games/applications can be patched, upgraded, or remastered to support the application of the ROG provided by the system software on the host system (such as but not limited to a PlayStation® 5 console) that is rendering the game for the HMD system (such as but not limited to a PlayStation® VR2 system).

Accordingly, an assembly includes a head-wearable extended reality (XR) display and at least one processor configured with instructions to determine a region of gaze (ROG) relative to the display of a wearer of the display. The instructions are executable to, based at least in part on the ROG, enhance presentation of at least one non-XR computer game on the display.

The instructions may be executable to determine the ROG based at least in part on images of the wearer from a camera.

In some examples, the instructions may be executable to enhance presentation of the non-XR computer game on the display at least in part by presenting video in the ROG on the display at a fidelity higher than video is presented outside the ROG on the display.

In other examples, the instructions may be executable to enhance presentation of the non-XR computer game on the display at least in part by presenting graphics in the ROG on the display at a fidelity higher than graphics presented outside the ROG on the display.

In some implementations, the instructions are executable to enhance presentation of the non-XR computer game on the display at least in part by presenting high graphical details at the center of ROG and continuously lower graphical details as a function of the distance of the graphical details from the center of ROG such that higher graphical details are shown in the ROG than outside the ROG. The graphical details can be non-player characters (NPC) or any other details represented in the non-XR computer game.

In example embodiments the instructions are executable to enhance presentation of the non-XR computer game on the display at least in part by presenting a high perspective distance based level of detail in the ROG on the display and continuously lower level of details based on the perspective distance, based on the distance of the details to the center of the ROG such that more detail is shown receding into the distance in the ROG than outside the ROG.

In examples, the instructions are executable to enhance presentation of the non-XR computer game on the display at least in part by presenting video in the ROG at a higher frame rate than video is presented outside the ROG.

If desired, the instructions can be executable to enhance presentation of the non-XR computer game on the display at least in part by presenting at least one user interface (UI) having at least a first selector selectable to invoke a first enhancement in the ROG and at least a second selector selectable to invoke a second enhancement in the ROG.

In some embodiments the instructions are executable to enhance presentation of the non-XR computer game on the display at least in part by presenting an additional virtual screen on the display.

In one example, the instructions are executable to enhance presentation of the non-XR computer game on the display at least in part by correlating the ROG to at least one user input signal.

In another aspect, a method includes receiving a computer simulation originally created for presentation on a non-extended reality (XR) system, and presenting the computer simulation on a virtual display within a XR display with at least one enhancement based at least in part on a person's region of gaze (ROG) relative to the virtual display.

In another aspect, a device with at least one computer memory that is not a transitory signal and that includes instructions executable by at least one processor to receive a non-XR computer game configured for presentation on a two-dimensional (2D) display and patched, upgraded, or remastered to be presented on an extended reality (XR) display. The instructions are executable to, based at least in part on a region of gaze (ROG) of a wearer of the XR display, present the computer game.

The details of the present application, both as to its structure and operation, can be best understood in reference to the accompanying drawings, in which like reference numerals refer to like parts, and in which:

DETAILED DESCRIPTION

Figure 1:
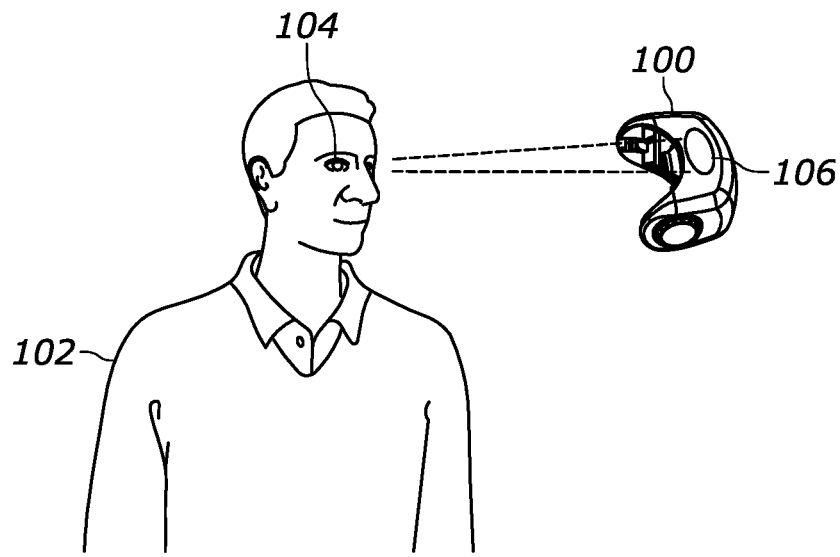
FIG. 1 illustrates a person and a VR system configured as a headset or HMD.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, mixed reality (MR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, a virtual reality (VR) headset 100 is shown that can be worn by a person 102 to play a VR computer game. The pose (position and orientation) of the head and/or eyes 104 of the person can be tracked, e.g., by analyzing images of the person from a camera on the headset 100, to determine, relative to the headset 100, a region of gaze (ROG) 106 for purposes to be shortly disclosed. It is to be understood that the ROG can be signaled to the various games and applications running on the host system connected to the VR system. The signal may include a coordinate of the gaze, a coordinate and a radius of the gaze, box coordinates defining an area of gaze, or other parameters to communicate the region of gaze from the VR system to a game or application.

Figure 2:
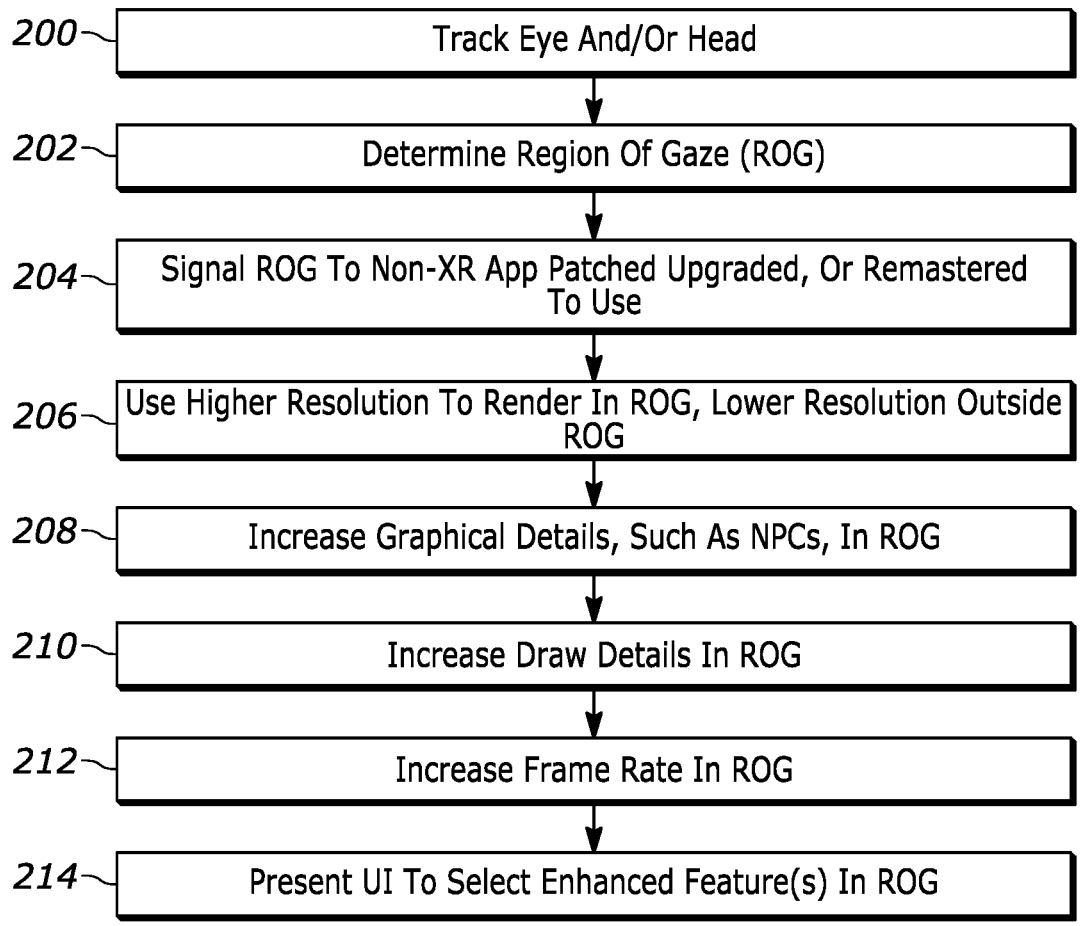
FIG. 2 illustrates example logic for using a region of gaze (ROG) of a wearer of a HMD system to enhance presentation on the system of a non-XR computer game, in example flow chart format.

Turning now to FIG. 2, commencing at block 200 the eye and/or head of the person in FIG. 1 is tracked using, e.g., camera images of the person in accordance with head/eye tracking principles. In addition, or alternatively, other sensors such as motion sensors such as an inertial measurement unit (IMU) may be used for this purpose. Proceeding to block 202, based on the tracking at block 200 the ROG 106 in FIG. 1 is determined and at block 204 signaled to the various games and applications running on the host system connected to the VR system.

The existing non-XR games/applications can be patched, upgraded or remastered to support the application of the ROG provided by the system software on the host system (such as but not limited to a PlayStation® 5 console) that is rendering the game for the VR system (such as but not limited to a PlayStation® VR2 system) to enhance presentation of the non-XR game.

For example, one such enhancement may be implemented at block 206, in which higher fidelity or resolution video is presented within the ROG 106 and lower fidelity or resolution video presented on the headset 100 outside the ROG 106. The foveated rendering system therefore allocates more or the same graphical resources to the areas of the virtual screen under gaze, while lowering the graphical resources for the regions of the virtual screen outside of the gaze region. The foveated rendering applies not only to game video but also to enhanced graphics, wherein higher resolution/quality textures, geometry and shading can occur in the high fidelity region (ROG 106) compared to the lower quality region and standard rendering for a TV (outside the ROG 106).

Further, as indicated at block 208 the number of graphical details may be increased within the ROG 106 but not outside the ROG 106. Examples of such details include presenting a greater number of non-player characters (NPC) and objects in the scene within the ROG 106 than otherwise would be presented or that are presented in regions of the display outside the ROG 106. In addition, or alternatively, the fidelity of objects such as NPC may be greater in the ROG than outside the ROG.

Block 210 indicates that another example enhancement can include increased draw distance, in which more detail is shown receding into the distance in the ROG 106 than compared to standard rendering for a TV as may be implemented for display regions outside the ROG.

Yet again, block 212 indicates that another example enhancement can include an increased frame rate (FR) within the ROG 106 compared to the FR outside the ROG. For instance, a graphically rich game that would typically run at a low frame rate, can run at a higher frame rate within the ROG 106. For example, a game normally presented at thirty frames per second (30 fps) game can run at 60 fps, or a 60 fps game can run at 90 fps or 120 fps.

Figure 3:
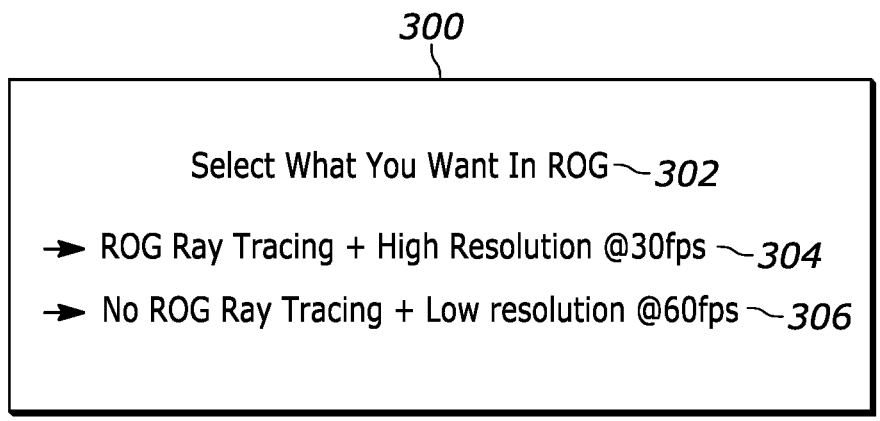
FIG. 3 illustrates an example user interface (UI) to permit a person to select between various enhancements.

Further, block 214 indicates that graphically intense, but separate features may be integrated and a user (such as the person 102) may be given the option of selecting one of multiple combinations of features. FIG. 3 illustrates further.

In FIG. 3, a display 300 such as any display herein may present a user interface (UI) visually, audibly, tactilely, or any combination thereof in which a prompt 302 may be presented for the person to select which enhancement the person desires to be implemented within the ROG. In the example shown, first and second options 304, 306 are presented for selection. The example option 304 includes implementing in the ROG both ray tracing and high quality rendering at a relatively low (e.g., thirty) frame rate while the second example option 306 may include implementing no ray tracing and a lower quality rendering but at a higher (e.g., sixty) frame rate. It should be understood that such a system could allow users wearing a VR HMD system to experience non-XR games and applications with higher fidelity graphics than shown on a standard TV. It should be further understood that the developers of the non-XR game or application may choose to limit or remove user choice on ROG enhancements and select a set of ROG enhancements themselves.

Figure 4:
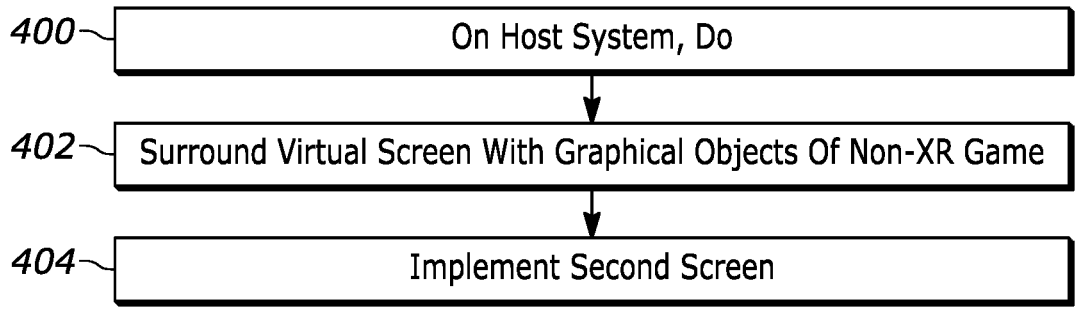
FIG. 4 illustrates example logic in example flow chart format for a host game system such as a computer game console and/or HMD system.

FIG. 4 illustrates at block 400 that alternatively to the above or in conjunction with the above, foveated rendering can free up graphical resources on the host system (for example, 50% of graphic processing resources) to enable, at block 402, increased fidelity and complexity of the presentation of the virtual screen, which includes the graphical objects around the virtual screen. Foveated rendering enables the virtual screen to be surrounded by graphical assets associated with the non-XR game being played through the VR system. In addition to patching, upgrading, or remastering the non-XR game for the application of the ROG, developers can provide 3D graphical resources to be rendered around the virtual screen.

Figure 6:
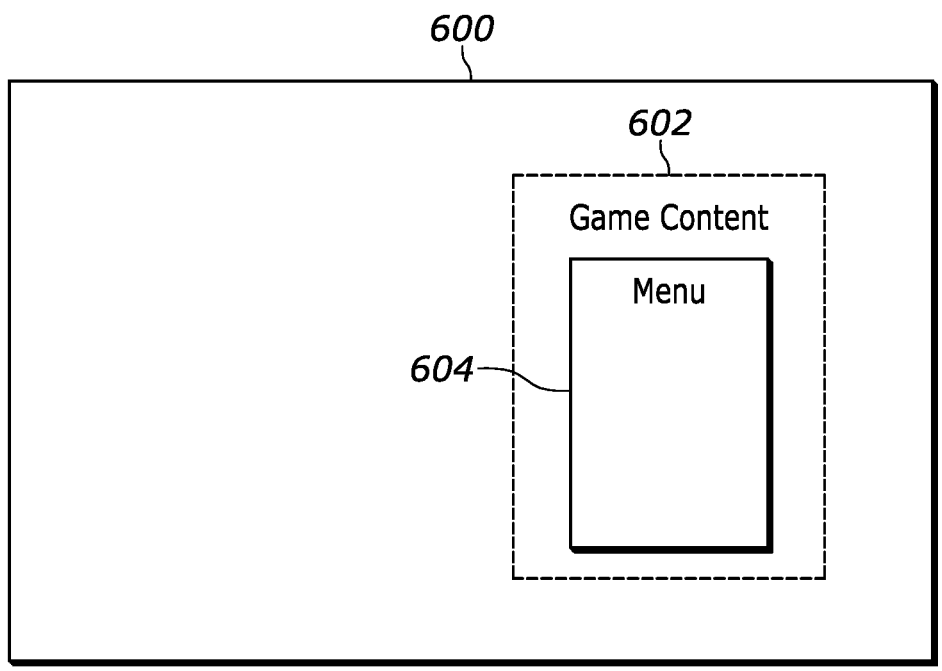
FIGS. 6 and 7 are example screen shots of additional example ROG-based enhancements.
Figure 7:
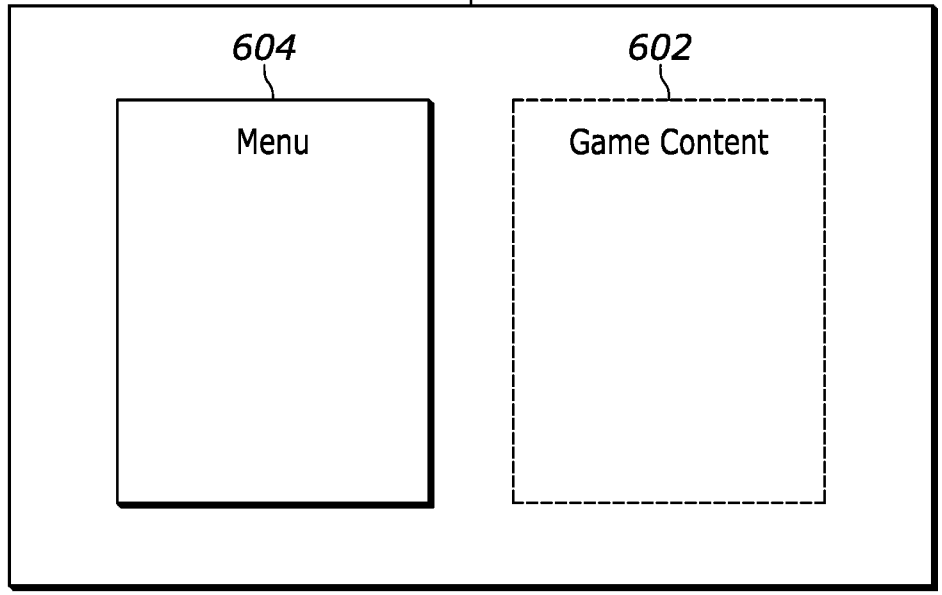

As indicated at block 404, second screen functionality can be enabled by foveated rendering. In such an example and briefly skipping to FIGS. 6 and 7 illustrating a display 600 such as the headset 100, game content 602 such as a map screen, weapons inventory screen, user chat window, etc. which in the conventional rendering of the non-XR game on the headset 100 (FIG. 6) may have been hidden behind a user interaction such as a button press or in-game menu 604 can instead be shown simultaneously (FIG. 7) as an additional virtual screen.

Accordingly, one or many additional virtual screens can be arranged automatically, by the game developers and/or by the user around the main non-XR game virtual screen, to simultaneously provide the user a multi-screen setup similar to multi-monitor PC gaming. This allows users to play their non-XR game and be able to glance at their map, inventory, chat, etc. without needing to interrupt their main gameplay flow.

Figure 5:
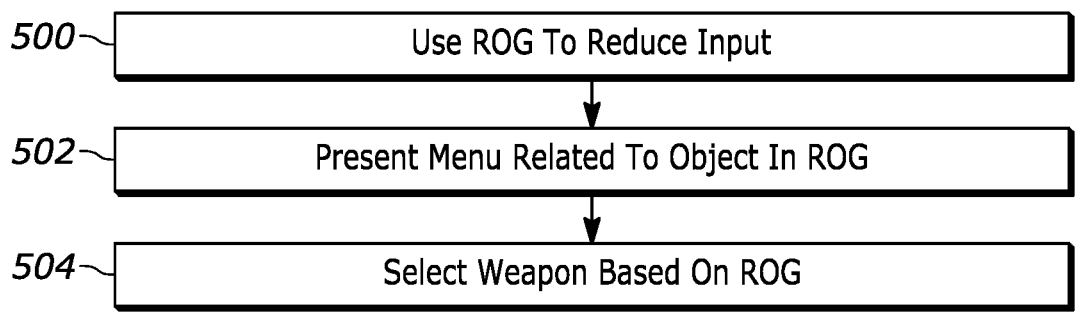
FIG. 5 illustrates example logic in example flow chart format for example ROG-based enhancements.

Return now to FIG. 5, which illustrates how using foveated rendering to enhance the presentation for the ROG 106 may be used to enhance user interaction. Developers can enhance their existing games/applications or develop entirely new games/applications using the ROG provided by this system. For example, a developer of a strategy game that has many user interface elements (maps, weapon selections, inventories, stats, skill trees, deployment screens, etc.) can use the ROG to streamline the user experience. At block 500 the number of button presses, joystick motions, menu options, etc. can be reduced by inferring user intent from the ROG, in which a ROG superimposed on an object such as a weapon for example can invoke presentation, at block 502, of a menu related to the object, such as a weapon selection menu. The user accordingly can gaze at a new item such as a weapon in the menu to select and press a single button or simply let his gaze dwell on the selected item to activate its selection at block 504. Such a system can reduce the time and complexity (number of button presses, menus, sub-menus, etc.) of various game user interactions, without removing those features from the game.

In addition to the above, the history of the location of the ROG 106 over time may be used for user interaction analytics. The ROG can be used by developers in patched, upgraded, or remastered games to gather statistics from users, determining where in their game or application draws the most user interest, or alternatively causes distraction. The developers of the game can use this data to improve the user experience, enhancing graphics and/or gameplay, or removing unwanted distractions based on user ROG.

It is to be appreciated that while the above example system is described as a Virtual Reality (VR) system using a user's ROG, such a system can be applied to Augmented Reality (AR) or Mixed Reality (MR), where non-XR games are played on virtual screens augmented to real world locations and displayed within an optical and/or video see-through AR head mounted display.

Figure 8:
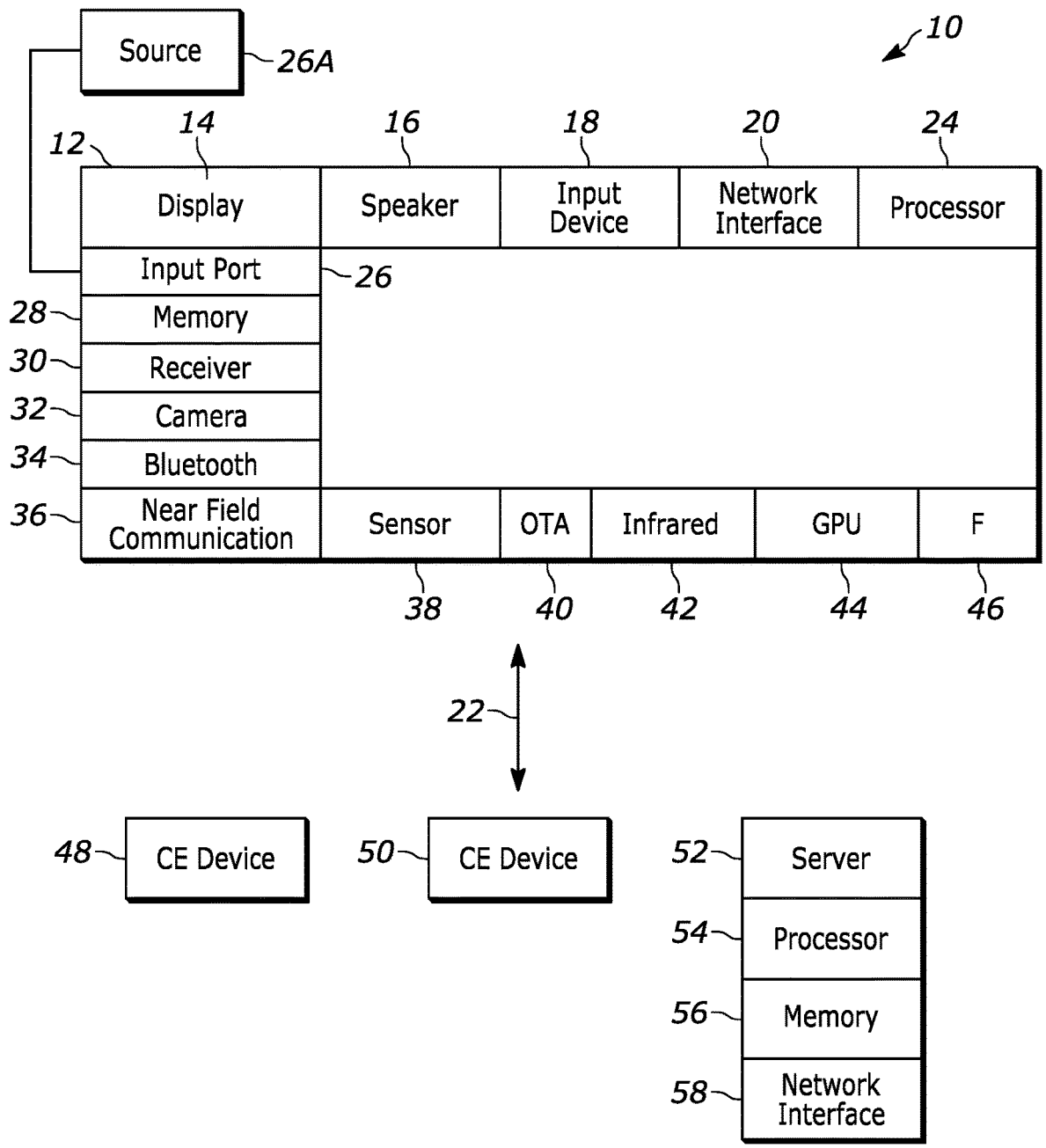
FIG. 8 is a block diagram of an example system in accordance with present principles perspective view of an example headset.

Referring to FIG. 8, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a transparent or non-transparent display for respectively presenting XR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

While the particular embodiments are herein shown and described in detail, it is to be understood that the subject matter which is encompassed by the present invention is limited only by the claims.

What is claimed is:

1. An assembly, comprising:
   a head-wearable extended reality (XR) display ("display");
   at least one processor configured with instructions to:
   determine a region of gaze (ROG) relative to the display of a wearer of the display; and
   based at least in part on the ROG, enhance presentation of at least one non-extended reality (XR) computer game on the display.

2. The assembly of claim 1, wherein the instructions are executable to determine the ROG based at least in part on images of the wearer from a camera.

3. The assembly of claim 1, wherein the instructions are executable to enhance presentation of the non-XR computer game on the display at least in part by:
   presenting video in the ROG on the display at a fidelity higher than video is presented outside the ROG on the display.

4. The assembly of claim 1, wherein the instructions are executable to enhance presentation of the non-XR computer game on the display at least in part by:
   presenting graphics in the ROG on the display at a fidelity higher than graphics presented outside the ROG on the display.

5. The assembly of claim 1, wherein the instructions are executable to enhance presentation of the non-XR computer game on the display at least in part by:
   presenting the highest number of graphical details within the ROG on the display and continuously lower numbers of graphical details on the display outside the ROG based on the distance of the graphical details from the center of the ROG.

6. The assembly of claim 1, wherein the instructions are executable to enhance presentation of the non-XR computer game on the display at least in part by:
   presenting the highest perspective distance based level of detail within the ROG on the display and continuously lower level of detail based on perspective distance, based on the distance of the details from the center of the ROG such that more detail is shown receding into the distance in the ROG than outside the ROG.

7. The assembly of claim 1, wherein the instructions are executable to enhance presentation of the non-XR computer game on the display at least in part by:
   presenting video in the ROG at a higher frame rate than video is presented outside the ROG.

8. The assembly of claim 1, wherein the instructions are executable to enhance presentation of the non-XR computer game on the display at least in part by:
   presenting at least one user interface (UI) comprising at least a first selector selectable to invoke a first enhancement in the ROG and at least a second selector selectable to invoke a second enhancement in the ROG.

9. The assembly of claim 1, wherein the instructions are executable to enhance presentation of the non-XR computer game on the display at least in part by:
   presenting at least one additional virtual screen on the display.

10. The assembly of claim 1, wherein the instructions are executable to enhance presentation of the non-XR computer game on the display at least in part by:
    correlating the ROG to at least one user input signal.

11. A method, comprising:
    receiving a computer simulation originally created for presentation on a non-extended reality (XR) system; and
    presenting the computer simulation on a XR display with at least one enhancement based at least in part on a person's region of gaze (ROG) relative to the display.

12. The method of claim 11, wherein the enhancement comprises:
    presenting graphics in the ROG on the display at a fidelity higher than graphics presented outside the ROG on the display.

13. The method of claim 11, wherein the enhancement comprises:
    presenting a first number of graphical details within the ROG on the display and continuously low numbers of graphical details, based on the distance of the graphical details to the center of the ROG.

14. The method of claim 11, wherein the enhancement comprises:
    presenting a first draw distance in the ROG on the display and a second draw distance in regions outside the ROG on the display such that more detail is shown receding into the distance in the ROG than outside the ROG.

15. The method of claim 11, wherein the enhancement comprises:
    presenting video in the ROG at a higher frame rate than video is presented outside the ROG.

16. The method of claim 11, wherein the enhancement comprises:
    presenting at least one user interface (UI) comprising at least a first selector selectable to invoke a first enhancement in the ROG and at least a second selector selectable to invoke a second enhancement in the ROG.

17. The method of claim 11, wherein the enhancement comprises:
    presenting at least one additional virtual screen on the display.

18. The method of claim 11, wherein the enhancement comprises:
    correlating the ROG to at least one user input signal.

19. A device comprising:
    at least one computer memory that is not a transitory signal and that comprises instructions executable by at least one processor to:
    receive a computer game configured for presentation on a non-extended reality (XR) display and patched, upgraded, or remastered to be presented on an extended reality (XR) display; and
    based at least in part on a region of gaze (ROG) of a wearer of the XR display, present the computer game.

* * * * *